US012535984B2

(12) United States Patent
Wang et al.

(10) Patent No.: US 12,535,984 B2
(45) Date of Patent: Jan. 27, 2026

(54) CONTROL METHOD AND ELECTRONIC DEVICE

(71) Applicant: Lenovo (Beijing) Limited, Beijing (CN)

(72) Inventors: Xuejin Wang, Beijing (CN); Mingping Zhang, Beijing (CN); Hainan Cai, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/896,571

(22) Filed: Sep. 25, 2024

(65) Prior Publication Data

US 2025/0123790 A1    Apr. 17, 2025

(30) Foreign Application Priority Data

Oct. 13, 2023  (CN) .......................... 202311331478.8

(51) Int. Cl.
*G06F 3/14* (2006.01)
(52) U.S. Cl.
CPC ................. *G06F 3/1454* (2013.01)
(58) Field of Classification Search
CPC .... G06F 3/1454; G06F 3/0346; G06F 3/1423; G06F 3/14; G06F 3/147; G09G 2356/00; G09G 2370/16

See application file for complete search history.

(56) References Cited

U.S. PATENT DOCUMENTS

| | | | |
|---|---|---|---|
| 2012/0208466 A1* | 8/2012 | Park | H04N 21/4108 455/41.3 |
| 2020/0019367 A1* | 1/2020 | Sun | G06F 3/04883 |
| 2022/0365606 A1* | 11/2022 | Hinckley | G06F 3/0482 |
| 2023/0393700 A1* | 12/2023 | Louch | G09G 5/026 |

\* cited by examiner

*Primary Examiner* — Koosha Sharifi-Tafreshi
(74) *Attorney, Agent, or Firm* — ANOVA LAW GROUP, PLLC

(57) ABSTRACT

A control method includes: establishing a connection channel with a second electronic device; first condition is met, sending display data representing a first content to the second electronic device through the connection channel to cause the second electronic device to display the first content, and obtaining operation information on the first content obtained by the second electronic device through the connection channel; and if a second condition is met, displaying a second content and obtaining, through the connection channel, first coordinate information sent by the second electronic device and used to represent movement of a first target object, and displaying the first target object based on the first coordinate information, the first target object being used to operate the second content.

12 Claims, 8 Drawing Sheets

( 1 )

( 2 )

CONTROL METHOD AND ELECTRONIC DEVICE

CROSS-REFERENCES TO RELATED APPLICATION

This application claims priority to Chinese Patent Application No. 202311331478.8 filed on Oct. 13, 2023, the entire content of which is incorporated herein by reference.

FIELD OF TECHNOLOGY

The present disclosure relates to a control method and an electronic device.

BACKGROUND

Some electronic devices have screen projection function. When two electronic devices are connected for communication, the first device used for screen projection can send display content to the second device used for display such that the second device's display screen can output the display content.

In this screen projection mode, the display screen of the second device can only display the display content provided by the first device, but cannot display the display content of the second device itself, and the user can only operate the first device to adjust the display content. This screen projection method is limited and cannot meet the screen projection needs in specific scenarios.

SUMMARY

One aspect of this disclosure provides a control method. The control method includes establishing a connection channel with a second electronic device; if a first condition is met, sending display data representing a first content to the second electronic device through the connection channel to cause the second electronic device to display the first content, and obtaining operation information on the first content obtained by the second electronic device through the connection channel; and if a second condition is met, displaying a second content and obtaining, through the connection channel, first coordinate information sent by the second electronic device and used to represent movement of a first target object, and displaying the first target object based on the first coordinate information, the first target object being used to operate the second content.

Another aspect of the present disclosure provides a control method. The control method includes obtaining a target request through a connection channel with a first electronic device; based on the target request, creating a second target window that is in a disabled state, the second target window being determined based on a size of a first display screen of the first electronic device; if second coordinate information indicating movement of a second target object coincides with a target edge, controlling the second target window to be in a transparent display state, i.e., an invisible and enabled state (i.e., the second target window being invisible and enabled) and the second target object to be in a hidden state, and converting the second coordinate information from a first edge of the second target window to a second edge of the second target window; obtaining first coordinate information based on the second coordinate information; and sending the first coordinate information through the connection channel to cause the first electronic device to display a first target object based on the first coordinate information. The first edge coincides with the target edge, the second edge is opposite to the first edge, and the second target object is used to operate display content of a second display screen of the second electronic device. In addition, the first coordinate information is a mapping coordinate corresponding to the second target window obtained based on the actual coordinates of the second coordinate information. The first target object is used to operate the display content of the first display screen.

Another aspect of the present disclosure provides an electronic device. The electronic device includes a communication module, a detection module, a display screen, and a controller. The controller is configured to establish a connection channel with a second electronic device through the communication module. The controller is further configured to, if the detection module determines that a first condition is met, send display data representing a first content to the second electronic device through the connection channel to cause the second electronic device to display the first content, and obtain operation information on the first content obtained by the second electronic device through the connection channel. The controller is further configured to, if the detection module determines that a second condition is met, display a second content on the display screen and obtain, through the connection channel, first coordinate information sent by the second electronic device and used to represent movement of a first target object, and display the first target object based on the first coordinate information, the first target object being used to operate the second content.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Figure 1:
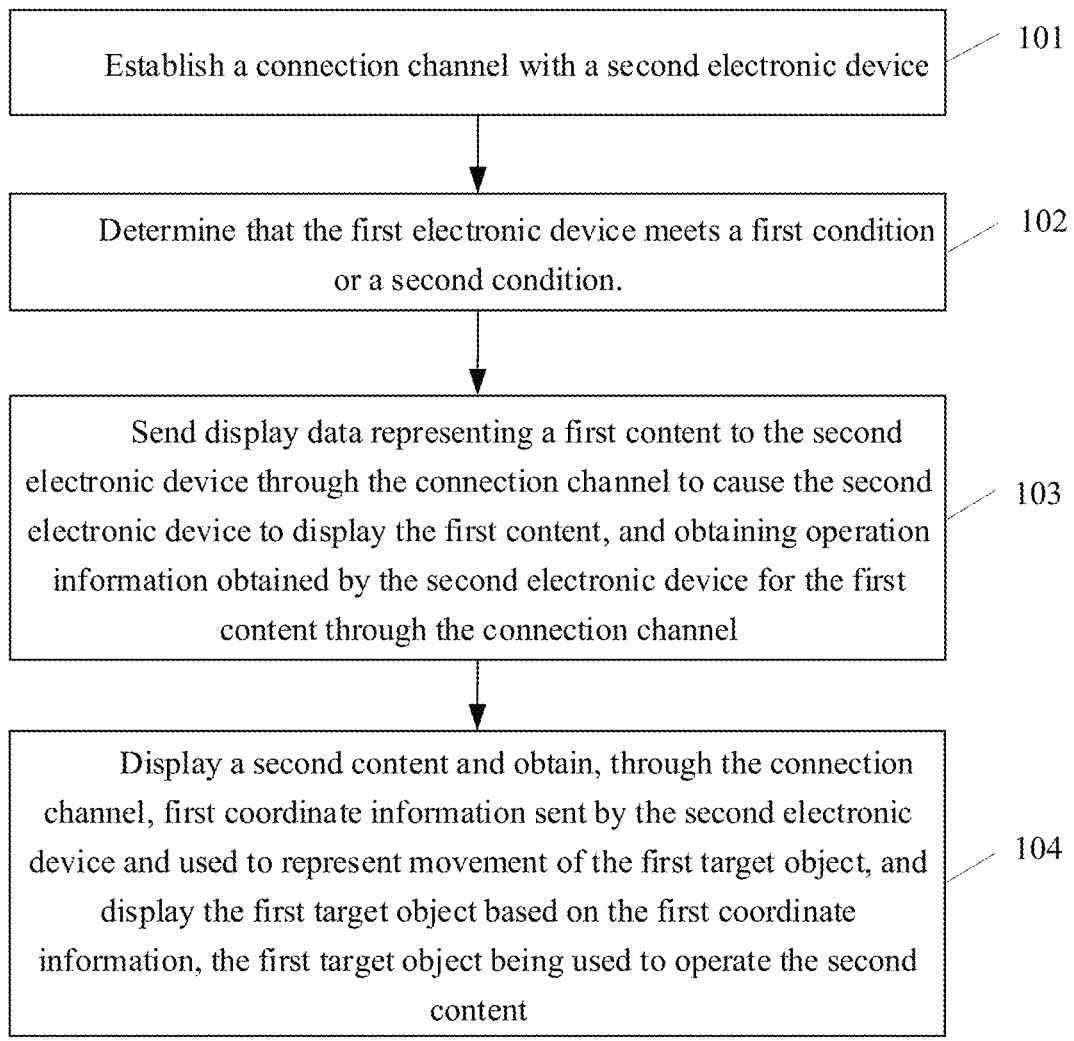
FIG. 1 is a flowchart of a control method according to some embodiments of the present disclosure.

Embodiments of the present disclosure provide a control method. FIG. 1 is a flowchart of a control method according to some embodiments of the present disclosure. The method will be described in detail below.

101, establishing a connection channel with a second electronic device.

The control method described in the present disclosure can be executed by a first electronic device. The first electronic device may be any electronic device that can establish a connection channel with a second electronic device and has data processing and display capabilities. For example, the first electronic device may be a smart phone or a tablet computer.

The second electronic device may be an electronic device having data processing and display capabilities and having input modules such as a keyboard, a mouse and/or a touch pad. For example, the second electronic device may be a desktop computer or a laptop computer.

The connection channel between the first electronic device and the second electronic device may be a wired connection channel based on a data line or a wireless connection channel based on a wireless signal. The wireless connection channel may be a wireless connection channel based on Bluetooth technology, or a wireless connection channel based on a wireless local area network, or a wireless connection channel based on other wireless communication technologies.

The first electronic device may establish a connection channel with the second electronic device when at least one of the following trigger conditions is detected.

The first trigger condition is when the first electronic device identifies that there is a connectable second electronic device within a certain range of the first electronic device. The first electronic device can scan the surrounding wireless signals in real time. When the wireless signal of the second electronic device is scanned, it can be determined that there is a second electronic device that can be connected within a certain range around the first electronic device.

The second trigger condition is when the first electronic device receives an operation instruction to connected to the second electronic device. The first electronic device can identify user input, such as key input, voice input, touch screen input, etc., and obtain operation instructions for connecting to the second electronic device based on these inputs.

The third trigger condition is when a target application of the first electronic device is initiated. The target application may include an application that needs to be connected to the second electronic device. For example, the target application may be a screen projection application, a game application, a video application, or a conference application. The applications of the first electronic device may be determined as trigger applications based on the functions of the applications themselves or based on user settings.

102, determining that the first electronic device meets a first condition or a second condition.

If the first electronic device meets the first condition, the process at 103 can be executed; if the first electronic device meets the second condition, the process at 104 can be executed.

Whether the first electronic device meets the first condition or the second condition can be determined based on various information of the first electronic device, which is not limited in the embodiments of the present disclosure.

For example, whether the first electronic device meets the first condition or the second condition may be determined based on the attitude of the first electronic device, or based on the application currently running on the first electronic device.

When it is determined based on the attitude of the first electronic device that the first condition or the second condition is met, the process at 102 may include: obtaining a target parameter of the first electronic device and determining the attitude of the first electronic device represented by the target parameter. If the target parameter indicates that the first electronic device is in a first attitude, it may be determined that the first condition is met. If the target parameter indicates that the first electronic device is in a second attitude, it may be determined that the second condition is met.

In some embodiments, the second attitude of the second electronic device may make it easier for an observer to observe the first display screen of the first electronic device than when the electronic device is in the first attitude.

In some embodiments, the target parameter may include parameters related to the attitude of the electronic device such as the pitch angle, roll angle and yaw angle parameters detected by the gyroscope of the first electronic device.

Figure 2:
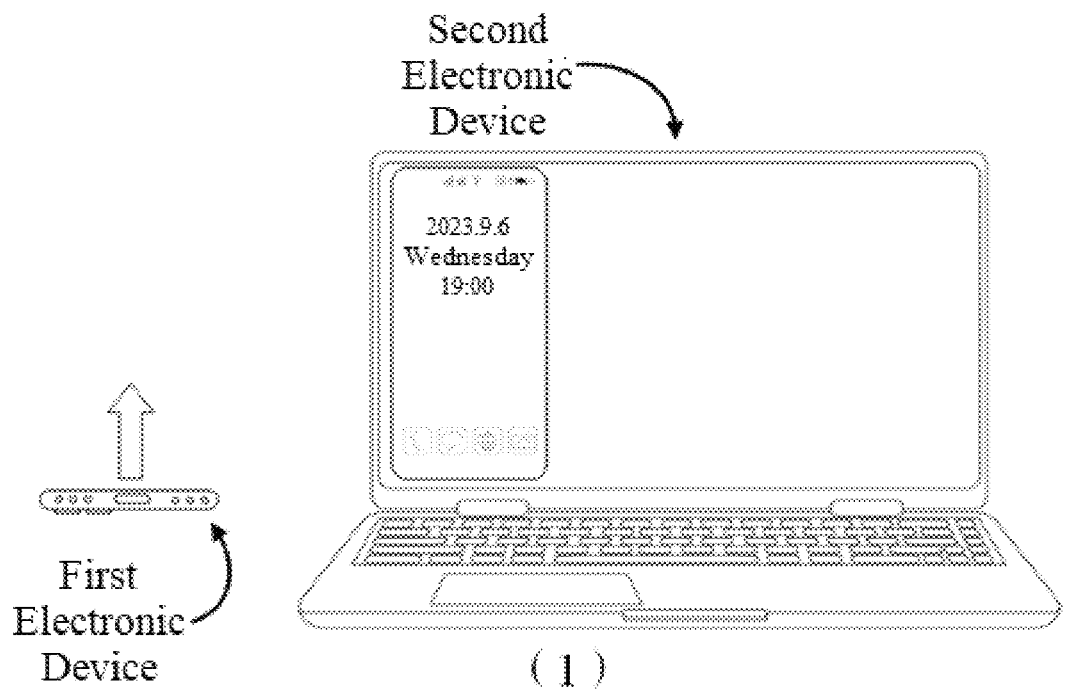
FIG. 2 is a schematic diagram of an attitude of an electronic device according to some embodiments of the present disclosure.
Figure 2:
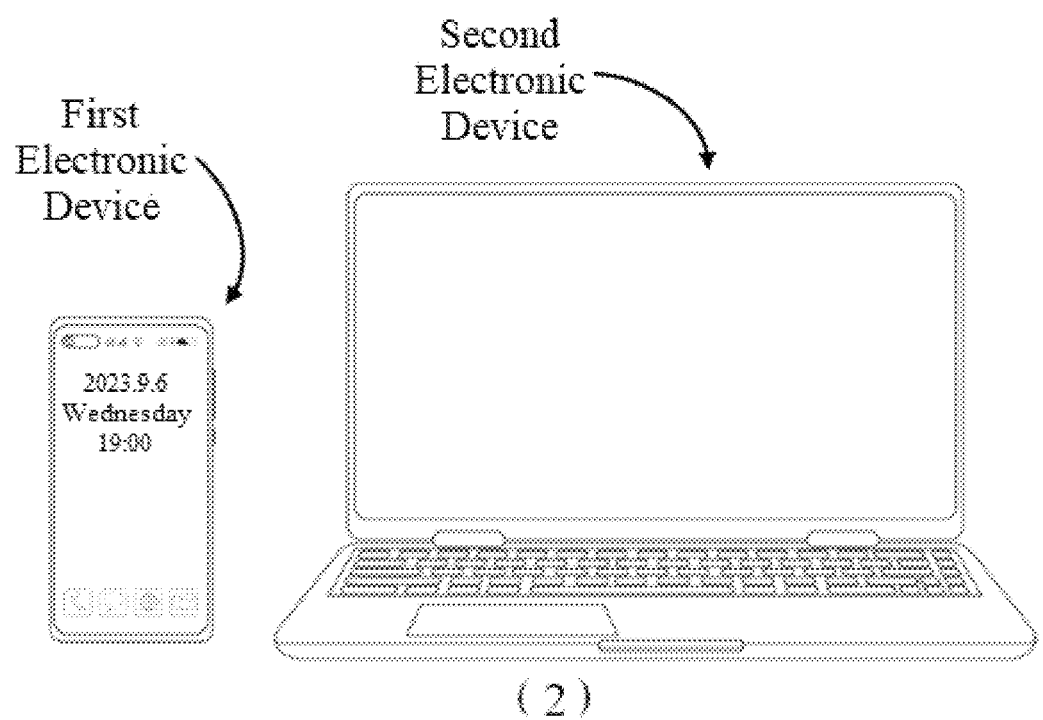

In some embodiments, the first attitude may be an attitude in which the first electronic device is placed horizontally, and the second attitude may be an attitude in which the first electronic device is placed vertically. Refer to FIG. 2, the first attitude may be the attitude shown in diagram (1) of FIG. 2, where the first electronic device is placed horizontally with the display screen facing upward, and the second attitude may be the attitude shown in (2) of FIG. 2, where the first electronic device is placed vertically with the display screen facing forward.

In this case, the first electronic device may determine the angle between the display screen and the horizontal plane based on the target parameter. If the angle is less than a preset first angle threshold, for example, less than 20°, the first electronic device may determine that it is in the first attitude. If the angle is greater than a preset second angle threshold, for example, greater than 70°, the first electronic device may determine that it is in the second attitude. In some embodiments, the first angle threshold may be less than the second angle threshold.

In some embodiments, the first attitude may also be an attitude in which the first electronic device is placed vertically with the display screen facing away from the observer, and the second attitude may be an attitude in which the first electronic device is placed vertically with the display screen facing the observer.

In this case, the first electronic device may determine the orientation of its own display screen based on the roll angle in the target parameter. If the display screen faces away from the observer, it may be determined to be in the first attitude. If the display screen faces the observer, it may be determined to be in the second attitude.

When it is determined that the first condition or the second condition is met based on the application currently running on the first electronic device, the process at 102 may include: determining whether the application currently running on the first electronic device has a screen projection requirement, if there is a screen projection requirement, determining that the first condition is met; if there is no screen projection requirement, determining that the second condition is met.

In some embodiments, the applications that require screen projection can be determined based on the applications' functions or the user's settings. For example, it may be determined that video applications and image applications, including but not limited to video playback applications, video conferencing application, image browsing applications, and image editing applications, have screen projection requirements, while other applications do not have screen projection requirements.

In some embodiments, the first electronic device may also determine whether the first condition or the second condition is met by combining its own attitude and attitude of the second electronic device.

The attitude of the second electronic device may be understood as the attitude of the second display screen of the second electronic device.

In some embodiments, the first electronic device may obtain an attitude parameter representing the attitude of the second electronic device from the connection channel, and determine whether the orientation of the first display screen is consistent with the orientation of the second display screen by combining the target parameter of the first electronic device and the attitude parameter of the second electronic device. If the two are inconsistent, it may be determined that the first condition is met, and if the two are consistent, it may be determined that the second condition is met.

The second display screen may be used to output the display content obtained by the second electronic device. When the second electronic device is a host, the second display screen may be a display connected to the host for communication. When the second electronic device is a notebook computer or an all-in-one computer, the second display screen may be a display screen integrated on the second electronic device.

In some embodiments, the first display screen may refer to a display screen of the first electronic device, for example, the first display screen may be a mobile phone screen of a smart phone.

103, sending display data representing a first content to the second electronic device through the connection channel to cause the second electronic device to display the first content, and obtaining operation information obtained by the second electronic device for the first content through the connection channel.

When the first condition is met, the first electronic device may operate based on a first mode to implement the display mode and operation mode described in the process at 103.

The first mode may also be referred to as the screen projection mode of the first electronic device. In the screen projection mode, the first electronic device may perform the following operations:

A1, creating a virtual screen based on the size of the second display screen of the second electronic device and the size of a first target window.

A2, obtaining display data of the first content based on the virtual screen.

A3, sending the display data to the second electronic device through the connection channel such that the second electronic device can display the first content in the first target window based on the display data.

A4, if second coordinate information representing the movement of a second target object is located in the first target window, obtaining first operation information through the connection channel, the second target object being used to operate the display content of the second display screen of the second electronic device, the operation information including operation events and operation coordinates.

A5, adjusting the first content in response to the first operation information.

In operation A1, the first electronic device may obtain the size of the second display screen through the connection channel, and obtain the size of the first target window created by the second electronic device.

In some embodiments, the second electronic device may create the first target window when the first electronic device determines that the first condition is met, or may create the first target window when the connection channel is successfully established. When the first electronic device determines that the first condition is met, the first electronic device sends a screen projection request to the second electronic device, and the second electronic device responds to the screen projection request to create a first target window.

The size of the first target window may be determined based on the size of the second display screen, or based on the size of the first display screen, or based on the user's configuration.

After obtaining the size of the first target window, the first electronic device may determine the resolution of the second display screen based on the size of the second display screen. Subsequently, based on the resolution of the second display screen and the size of the first target window, a virtual screen can be created whose resolution is not greater than the resolution of the second display screen and whose size is not greater than the size of the first target window.

The advantage of creating a virtual screen in this way is that when the second electronic device outputs the display data of the first content through the first target window, the display area of the first content does not exceed the area of the first target window such that the first content can be fully displayed in the first target window.

In operation A2, the first electronic device may output display data representing the first content through a virtual screen, and at the same time, use the screen recording interface of the first electronic device to read the display data output by the virtual screen.

In some embodiments, the first content output by the first electronic device on the virtual screen may be consistent with the display content of the physical screen of the first electronic device, that is, the first display screen, or may be inconsistent with the display content of the first electronic device. In addition, the first content and the display content of the first display screen may be related. For example, the first content and the display content of the first display screen may be the left and right parts or the upper and lower parts of the same document. Alternatively, the first content and the display content of the first display screen may also be unrelated such as application interfaces of two different applications.

After the first electronic device obtains the display data representing the first content, the first electronic device may send the display data to the second electronic device through the connection channel. In this way, the second electronic device can output display data in the first target window such that the area within the first target window in the second display screen can display the first content.

Figure 3:
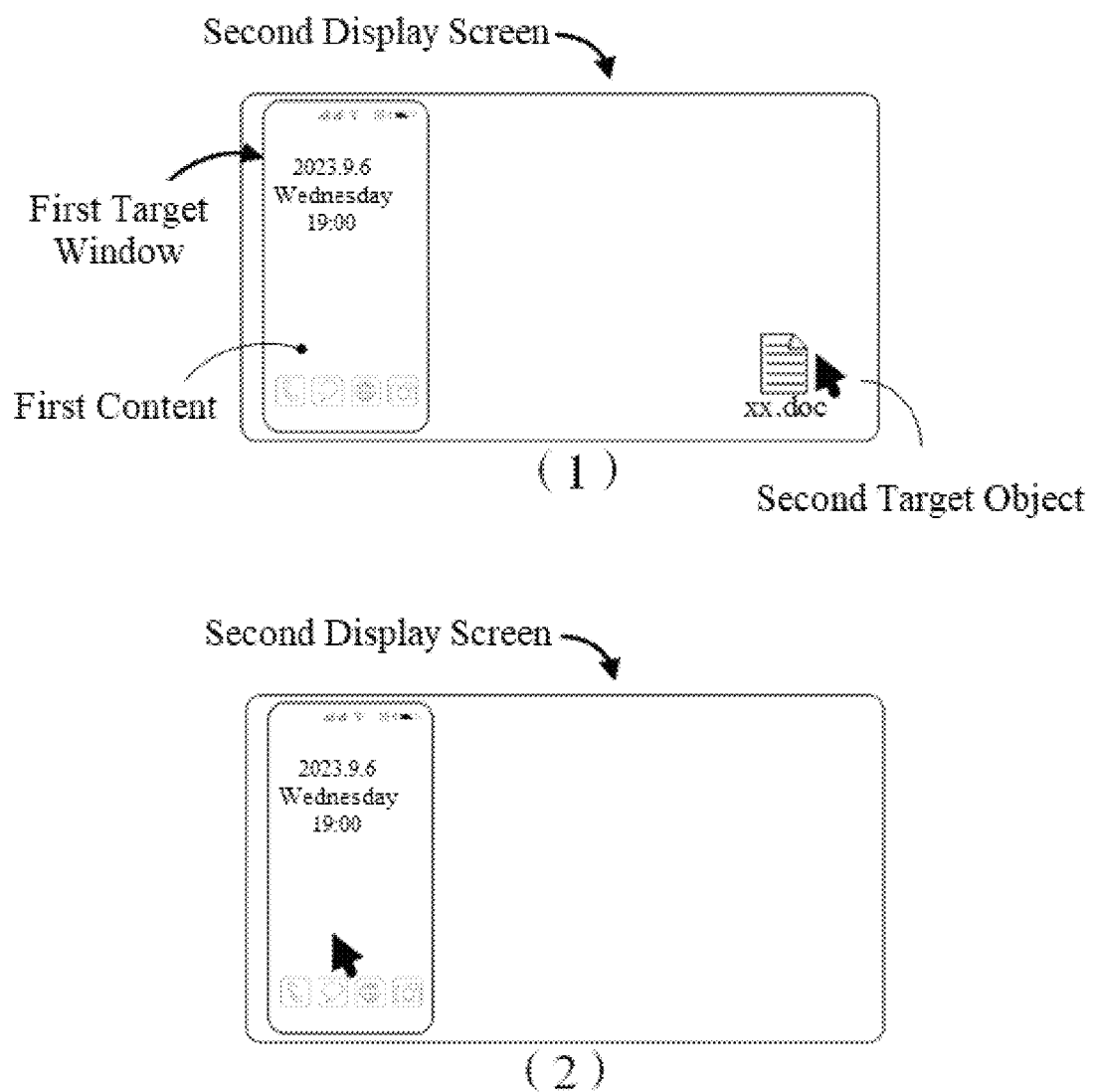
FIG. 3 is a schematic diagram of display content of the electronic device according to some embodiments of the present disclosure.

FIG. 3 is a schematic diagram of display content of the electronic device according to some embodiments of the present disclosure. Diagram (1) of FIG. 3 is equivalent to the display content of the second display screen after the first electronic device performs the operation at A3. At this time, the content displayed in the first target window on the left side of the second display screen is the first content provided by the first electronic device.

In addition, the second electronic device may operate the content displayed on the second display screen through the second target object. Take FIG. 3 as an example, the second target object can be a cursor displayed on the second display screen.

The user of the second electronic device may move the mouse device of the second electronic device, or slide on the touch pad of the second electronic device. The second electronic device may determine the second coordinate information representing the movement of the second target object based on the moving operation or sliding operation, and display the second target object at the actual coordinates indicated by the second coordination information on the second display screen.

In some embodiments, the second coordination information may change with the user's operation, and correspondingly, the second target object displayed based on the second coordination information may move on the second display screen.

As shown diagram (2) of FIG. 3, when the second coordinate information moves into the first target window and the second electronic device detects an operation event on the second target object, the second electronic device may send the first operation information to the first electronic device through the connection channel to trigger the first electronic device to perform operations A4 and A5.

Operation information may include operation events and operation coordinates. Operation events represent the user's operation behavior such as clicking the left mouse button, clicking the right mouse button, double-clicking, pressing the left and right mouse buttons at the same time, etc. Operation coordinates represent the coordinates of the second target object relative to the first target window when the user performs the operation behavior.

After obtaining the first operation information, the first electronic device first determines the operation object indicated by the first operation information based on the operation coordinates therein, then processes the operation object based on the operation event, obtains the adjusted first content, and sends the display data corresponding to the adjusted first content to the second electronic device through the connection channel. In this way, the second electronic device can display the adjusted first content in the first target window.

For example, after obtaining the first operation information, the first electronic device determines that the operation coordinates therein are located in the area where the browser application icon is located in the first content, thereby determining that the operation object is the browser application. Then, based on the operation event representing clicking the left mouse button, the browser application is started. After the browser application is started, the first electronic device obtains the application interface of the browser application as the adjusted first content, and sends the corresponding display data to the second electronic device. Then, the second electronic device outputs the adjusted first content through the first target window, that is, outputs the application interface of the browser application.

When sending the first operation information, the second electronic device may determine the operation coordinates included in the first operation information based on the obtained second coordinate information and the position information of the first target window on the second display screen. The determination method may be as follows.

When the second electronic device detects an operation event, it first obtains the second coordinate information to determine the coordinates of the second target object in the coordinate system of the second display screen at this time, which are recorded as (x1, y1).

Subsequently, the second electronic device determines the offset of the coordinate system of the first target window relative to the coordinate system of the second display screen based on the position of the first target window. For example, the vertex of the lower left corner of the first target window is located at (x2, y2) on the second display screen, and the coordinate system of the first target window takes the vertex of the lower left corner as the origin. Then the second electronic device can determine the offset as (x2, y2).

Lastly, the second electronic device subtracts the offset from the coordinates of the second target object on the second display screen, and the result is used as the coordinates of the second target object in the coordinate system of the first target window, that is, the operation coordinates described above. For example, offset (x2, y2) can be subtracted from the coordinates (x1, y1) to obtain the operation coordinates (x1-x2, y1-y2).

In some embodiments, when the second coordinate information is located in the first target window, the second electronic device may also send third operation information obtained by itself and not targeting the second target object to the first electronic device through the connection channel for the first electronic device to adjust the first content based on the third operation information. For example, the third operation information may be operation information obtained by the second electronic device through a keyboard. The first electronic device may add input text corresponding to the third operation information to the first content based on the third operation information, or control the movement of an object displayed in the first content based on the third operation information.

The advantage of adjusting the first content based on the operation information obtained by the second electronic device is that the use can use the input module of the second electronic device to control the first electronic device and the second electronic device at the same time without having to operate the two electronic devices at the same time, thereby improving the user experience.

In some embodiments, when the first electronic device operates in the first mode, the first electronic device may also perform the following process such that the second electronic device can created and display the first target window based on the obtained location information. The process includes: scanning a target signal, the target signal being radiated by the second electronic device; determining location information based on the target signal, the location information representing the relative position relationship between the electronic device and the second electronic device; and sending the location information to the second electronic device through the connection channel for the second electronic device to display the first target window based on the location information, the first target window being located in an area of the second display screen that can indicate the first electronic device.

In some embodiments, the target signal may be any wireless signal that can be used for positioning in the relevant technology.

For example, the target signal may be an ultra-wide band (UWB) signal radiated by a UWB tag of the second electronic device. In this case, the first electronic device may have a UWB module to scan the UWB signal radiated by the second electronic device through the UWB module.

The target signal may also be a Bluetooth signal radiated by the Bluetooth module of the second electronic device. In this case, the first electronic device may scan the Bluetooth signal radiated by the second electronic device through its own Bluetooth module.

Based on the different relative positions between the first electronic device and the second electronic device, the parameters of the target signal scanned by the first electronic device, such as the intensity and phase of the target signal, may be different. Therefore, the first electronic device can determine the position information representing the relative position relationship based on the parameters of the target signal.

The determined location information may be location information of the second electronic device relative to the first electronic device, for example, the second electronic device may be located on the right side of the first electronic device; or it may be location information of the first electronic device relative to the second electronic device, for example, the first electronic device may be located on the left side of the second electronic device. The former may be directly determined by the first electronic device based on the parameters of the target signal, and the latter may be obtained by the first electronic device after determining the former and converting it based on the former.

After the location information is sent to the second electronic device, if the location information is the location information of the first electronic device relative to the second electronic device, the second electronic device may directly display the first target window based on the location information; if the location information is the location information of the second electronic device relative to the first electronic device, the second electronic device may first convert the location information into the location information of the first electronic device relative to the second electronic device, and then display the first target window based on the converted location information.

The first target window being in the area of the second display screen that can indicate the first electronic device may indicate that the position of the first target window on the second display screen matches the position relationship of the first electronic device relative to the second electronic device.

For example, if the first electronic device is located on the left side of the second electronic device, the second electronic device may display the first target window on the left side of the second display screen.

In some embodiments, the location information may also be directly determined by the second electronic device, that is, the second electronic device may scan the target signal radiated by the first electronic device, determine the location information based on the target signal, and then display the first target window based on the location information.

The advantage of displaying the first target window based on the location information is that the display position of the /t1 is controlled to match the actual position of the first electronic device such that the user can quickly find the first target window on the second display screen, thereby improving the user experience.

104, displaying a second content and obtaining, through the connection channel, first coordinate information sent by the second electronic device and used to represent movement of the first target object, and displaying the first target object based on the first coordinate information, the first target object being used to operate the second content.

In some embodiments, the second content may be the display content obtained by the first electronic device, for example, it can be the system interface of the operating system of the first electronic device, or it can be the application interface of the application program running on the first electronic device, or it can be the video or image output by the first electronic device.

When the second condition is met, the first electronic device can operate based on the second mode to implement the display mode and operation mode described in the process at 104.

The second mode may also be referred to as a cross-screen operation mode of the first electronic device. In the second mode, the first electronic device may perform the following operations:

B1, obtaining the first coordinate information for representing the movement of the first target object through the connection channel.

B2, displaying the first target object based on the first coordinate information.

B3, obtaining the second operation information through the connection channel, and adjusting the second content in response to the second operation information.

The first coordinate information may be determined by the second electronic device based on the second coordinate information. For the method in which the second electronic device determines the first coordinate information, reference can be made to the embodiment corresponding to FIG. 6.

The first coordinate information may indicate the position of the first target object in the first display screen.

In some embodiments, the second electronic device may provide the first coordinate information to the first electronic device after the connection channel is established.

In some embodiments, the second electronic device may also provide the first coordinate information to the first electronic device when the connection channel is established and it is determined that a specific condition is met, and not provide the first coordinate information to the first electronic device when it is determined that the specific condition is not met.

Figure 4:
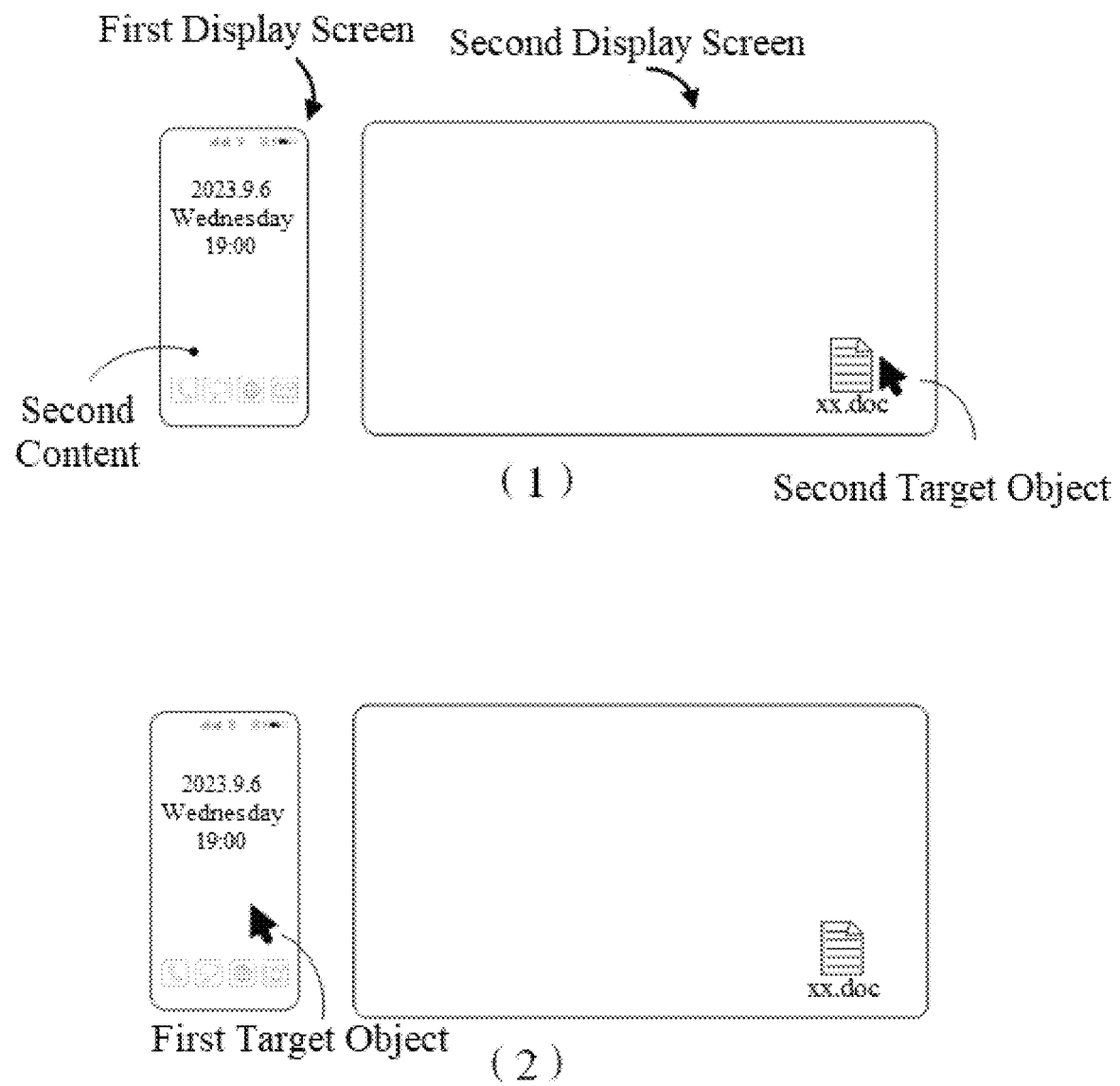
FIG. 4 is a schematic diagram of another display content of the electronic device according to some embodiments of the present disclosure.

In this case, for the display contents of the first display screen and the second display screen, reference can be made to FIG. 4. Diagram (1) of FIG. 4 shows the display content when the specific condition is not met. In this case, the second electronic device displays the second target object on the second display screen based on the obtained second coordinate information. The first electronic device does not obtain the first coordinate information. Therefore, the second content is only displayed on the first display screen.

Diagram (2) of FIG. 4 shows the display content when the specific condition is met. In this case, the second electronic device controls the second target object to be in a hidden state, that is, the second target object is not displayed. At the same time, the second electronic device determines the first coordinate information based on the second coordinate information, sends the first coordinate information to the first electronic device through the connection channel, and the first electronic device displays the second content on the first display screen. In addition, the first target object is displayed at the position indicated by the first coordinate information in the first display screen, such as the cursor shown in diagram (2) of FIG. 4.

In operation B3, after detecting an operation event on the second target object, the second electronic device may obtain the second operation information based on the operation event, and send the second operation information to the first electronic device through the connection channel.

In some embodiments, the second electronic device may determine the corresponding first coordinate information based on the second coordinate information when the operation event is detected. The second electronic device may use the first coordinate information as the operation coordinates, and combine the operation coordinates and the detected operation event into the second operation information.

The second electronic device may provide the second operation information to the first electronic device after the connection channel is established. Alternatively, the second electronic device may provide the second operation information when then connection channel is established and the above specific condition is met, and may not provide the second operation information if the specific condition is not met.

When the second operation information is not provided, the second electronic device may adjust the display content of the second display screen based on the operation event for the second target object.

The manner in which the first electronic device adjusts the second content in response to the second operation information is consistent with the manner in which the first electronic device adjusts the first content in response to the first operation information, which will not be repeated here.

In some embodiments, the second electronic device may also send fourth operation information obtained by itself and not targeting the second target object to the first electronic device through the connection channel when the specific condition is met. In this way, the first electronic device can adjust the second content based on the fourth operation information. The manner in which the first electronic device adjusts the second content in response to the fourth operation information is consistent with the manner in which the first electronic device adjusts the first content in response to the third operation information, which will not be repeated here.

In some embodiments, the specific condition that triggers the second electronic device to provide the first coordinate information and the second operation information may be that the second coordinate information coincides with a target edge of the second display screen.

The target edge may be an edge where the first electronic device is located. For example, if the first electronic device is located on the left side of the second electronic device, the target edge may be the left edge of the second display screen; if the first electronic device is located on the right side of the second electronic device, the target edge may be the right edge of the second display screen.

In some embodiments, when the first electronic device operates based on the second mode, the following process may be performed for the second electronic device to determine the target edge based on the location information. The process includes: scanning the target signal, the target signal being radiated by the second electronic device; determining location information based on the target signal, the location information representing the relative position relationship between the electronic device and the second electronic device; and sending the location information to the second electronic device through the connection channel such that the second electronic device determines the target edge based on the location information, the target edge being an edge where the second display screen indicates the first electronic device is located.

The process of the first electronic device obtaining the location information in the above manner is consistent with the process of the first electronic device obtaining the location information in the first mode, which will not be repeated here.

Determining the target edge based on the location information can simplify the operations that the user needs to perform in the second mode and improve the user experience.

In some embodiments, in the second mode, the first electronic device may also send the size of the first display screen to the second electronic device through the connection channel such that the second electronic device can create a second target window based on the size of the first display screen.

In some embodiments, after obtaining the size of the first display screen, the second electronic device may create a second target window having the same size as the second display screen.

The second target window may be created based on the location information, and the second target window may be located in an area where the second display screen can indicate the first electronic device. For example, if the first electronic device is located on the right side of the second electronic device, then the second target window may be located on the right side of the second display screen.

In addition, the second target window may have a first edge overlapping with the target edge, and a second edge opposite to the first edge.

Figure 5:
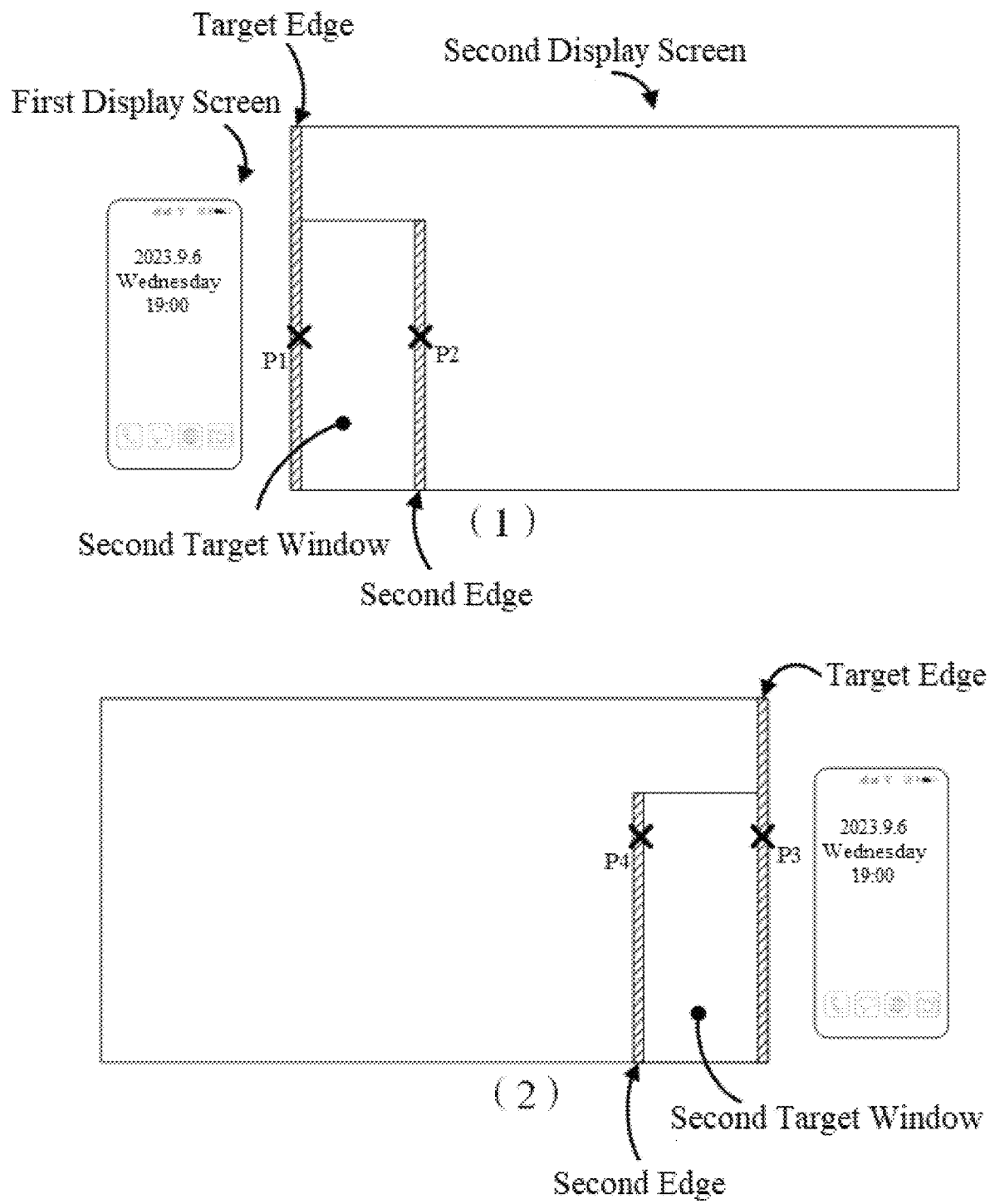
FIG. 5 is a schematic diagram of a second target window and a target edge according to some embodiments of the present disclosure.

Take FIG. 5 as an example. The first electronic device is located on the left side of the second electronic device, the target edge is the left edge of the second display screen, the second target window is located on the left side of the second display screen, the left edge of the second target window is the first edge, and the right edge of the second target window is the second edge.

The first electronic device is located on the right side of the second electronic device, the target edge is the right edge of the second display screen, the second target window is located on the right side of the second display screen, the right edge of the second target window is the first edge, and the left edge of the second target window is the second edge.

In the case where the second target window is created, the first coordinate information may be, if the second coordinate information representing the movement of the second target object coincides with the target edge of the second display screen of the second electronic device, the mapping coordinate corresponding to the second target window obtained based on the actual coordinates of the second coordinate information.

Consistent with the present disclosure, when the first condition is met, the first electronic device can display the first content through the display screen of the second electronic device, and can also operate the first content through the operation information of the second electronic device. When the second condition is met, the first electronic device can display the second content generated by itself and can also display the target object based on the coordinate information provided by the second electronic device. Therefore, this technical solution can meet the needs of controlling another device through one device connected by screen projection in some usage scenarios, and displaying the content generated by two devices on one device at the same time.

Figure 7:
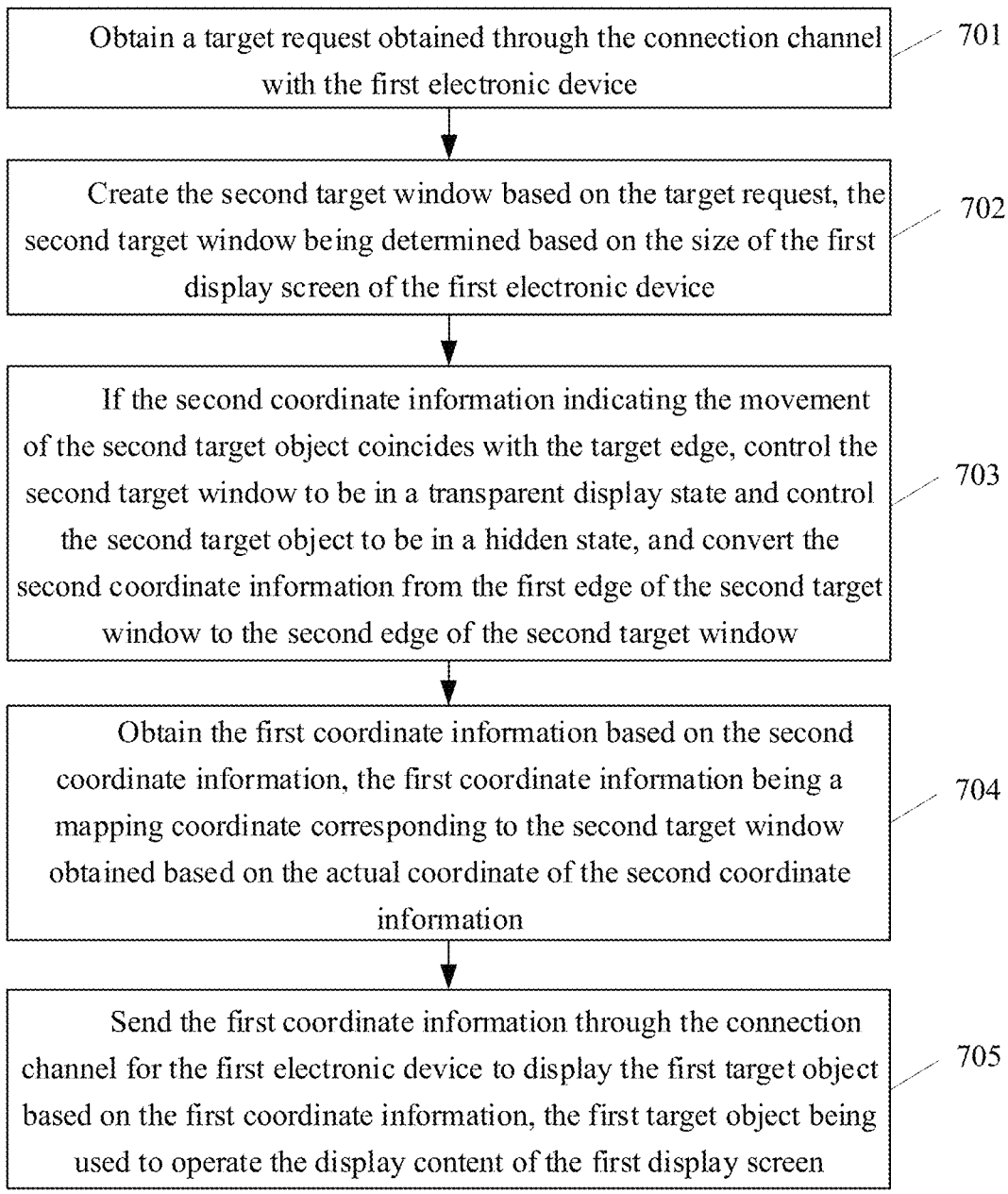
FIG. 7 is a flowchart of another control method according to some embodiments of the present disclosure.

FIG. 7 is a flowchart of another control method according to some embodiments of the present disclosure. The method will be described in detail below.

The control method provided in this embodiment can be executed by the second electronic device.

701, obtaining a target request obtained through the connection channel with the first electronic device.

In some embodiments, the first electronic device may send a target request to the second electronic device after determining that the second condition is met. The target request may carry the size of the first display screen and may also carry the location information detected by the first electronic device.

702, creating the second target window based on the target request, the second target window being in a disabled state and being determined based on the size of the first display screen of the first electronic device.

For the method of creating the second target window, reference can be made to the content relevant to creating the second target window in the foregoing embodiments, which is not limited in the embodiments of the present disclosure.

703, if the second coordinate information indicating the movement of the second target object coincides with the target edge, controlling the second target window to be in a transparent display state i.e., an invisible and enabled state (i.e., the second target window being invisible and enabled) and controlling the second target object to be in a hidden state, and converting the second coordinate information from the first edge of the second target window to the second edge of the second target window.

In some embodiments, the first edge may coincide with the target edge, the second edge may be opposite to the first edge, and the second target window may be used to operate the display content of the second display screen of the second electronic device.

The target edge may be an edge of the second display screen indicating where the first electronic device is located. The target edge may be determined based on the configuration of the user of the second electronic device, or may be determined based on the location information.

Converting the second coordinate information from the first edge to the second edge can be understood as translating the second coordinate information from the first edge to the second edge.

For example, assume that the first edge is the vertical edge at the horizontal coordinate x3 in the coordinate system of the second display screen, and the second edge is the vertical edge at the horizontal coordinate x4 in the coordinate system of the second display screen. Before the conversion, the second coordinate information is (x3, y3). When the second electronic device performs the conversion, the second coordinate information can be translated from the horizontal coordinate x3 to the horizontal coordinate x4, and the converted second coordinate information is (x4, y3).

Take FIG. 5 as an example. In diagram (1) of FIG. 5, the position indicated by the second coordinate information before conversion may be P1, and the position indicated by the second coordinate information after conversion becomes P2. In diagram (2) of FIG. 5, the position indicated by the second coordinate information before conversion may be P3, and the position indicated by the second coordinate information after conversion becomes P4.

704, obtaining the first coordinate information based on the second coordinate information, the first coordinate information being a mapping coordinate corresponding to the second target window obtained based on the actual coordinate of the second coordinate information.

In the process at 704, the second electronic device may first determine whether the origin of the coordinate system of the second target window coincides with the origin of the coordinate system of the second display screen. If the two coincide, the second electronic device may determine the second coordinate information as the first coordinate information. If the two do not coincide, the second electronic device may determine the offset of the coordinate system origin of the second target window relative to the coordinate system origin of the second display screen, and adjust the actual coordinates indicated by the second coordinate information based on the offset to obtain the first coordinate information.

Take FIG. 5 as an example. It is assumed that the coordinate system of the second display screen takes the vertex at the lower left corner of the second display screen as the origin, and the coordinate system of the second target window takes the vertex at the lower left corner of the second target window as the origin.

In the case shown in diagram (1) of FIG. 5, the vertex of the lower left corner of the second target window coincides with the vertex of the lower left corner of the second display screen. Therefore, the second electronic device can determine the second coordinate information as the first coordinate information.

In the case shown in diagram (2) of FIG. 5, the vertex of the lower left corner of the second target window does not coincide with the vertex of the lower left corner of the second display screen. Assume that the coordinates of the vertex of the lower left corner of the second target window in the second display screen are (x5, 0), the second electronic device can determine that the offset of the origin of the coordinate system of the second target window relative to the origin of the coordinate system of the second display screen is (x5, 0). After the second electronic device obtains the second coordinate information (x6, y6), the second electronic device subtracts the offset from the second coordinate information and obtains the result as the first coordinate information, that is, (x6-x5, y6).

705, sending the first coordinate information through the connection channel for the first electronic device to display the first target object based on the first coordinate information, the first target object being used to operate the display content of the first display screen.

After the first electronic device obtains the first coordinate information, since the second target window and the first display screen have the same size, the first electronic device may directly display the first target object at the position indicated by the first coordinate information in the first display screen.

For example, if the first coordinate information is (x7, y7), the first electronic device can display the first target object at the position (x7, y7) on the first display screen.

The control method of this embodiment will be described below with reference to the example shown in FIG. 6, which is a schematic diagram of display contents of the first display screen and the second display screen.

Figure 6:
FIG. 6 is a schematic diagram of display contents of the electronic device according to some embodiments of the present disclosure.
Figure 6:
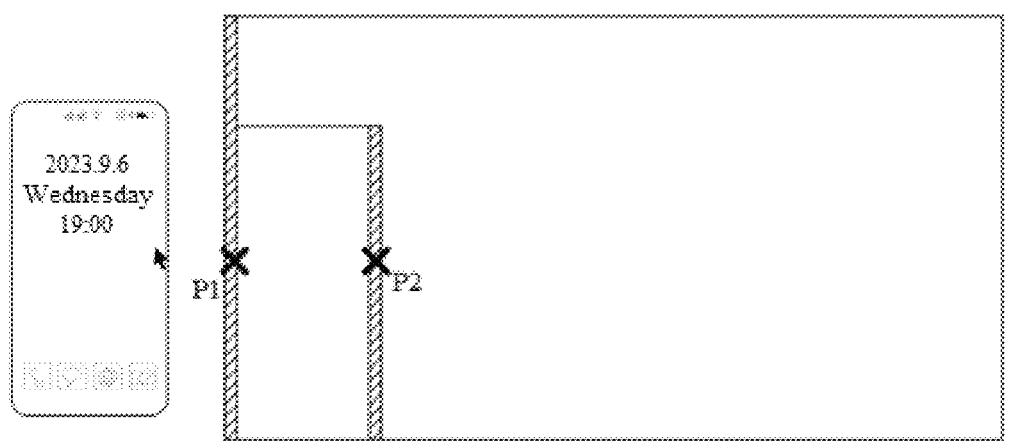
Figure 6:
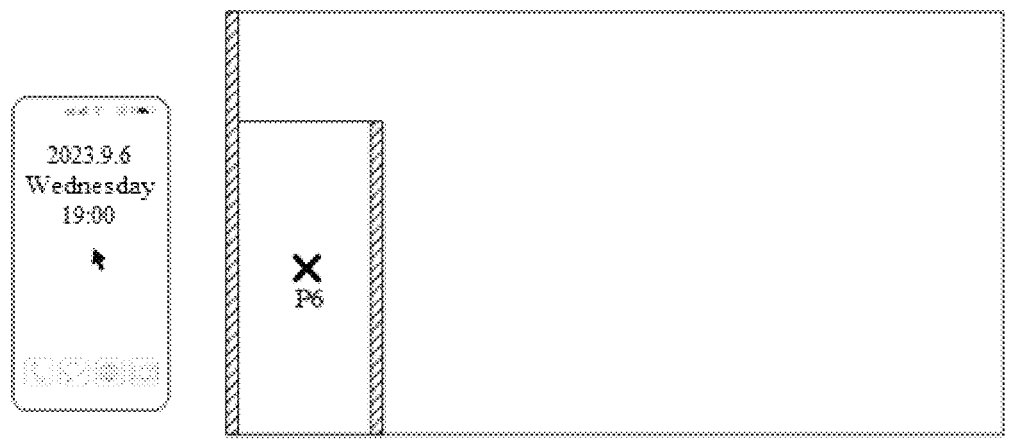

When the second coordinate information has not moved to the target edge, for example, when it is located at position P5 shown in diagram (1) of FIG. 6, the second display screen normally displays the second target object at the position indicated by the second coordinate information.

After that, when the second coordinate information moves to the position where it coincides with the target edge, that is, moves to the position P1 shown in diagram (2) of FIG. 6, The second electronic device controls the second target object to be in a hidden state, no longer displays the second target object, and converts the second coordinate information from the P1 position to the P2 position that coincides with the second edge.

In addition, the second electronic device obtains the first coordinate information relative to the second target window based on the second coordinate information. That is, the first coordinate information of the position P2 in the coordinate system of the second target window is obtained, and the information is sent to the first electronic device. Then, the first electronic device displays the first target object at the edge of the first display screen on the same side as the second edge, that is, at the right edge of the first display screen, based on the received first coordinate information.

Refer to diagram (3) of FIG. 6. After the second coordinate information is converted to the second edge, the second electronic device continues to respond to the user's operation and moves the second coordinate information to the left from the second edge, for example, to the position P6 shown in diagram (3) of FIG. 6. At this time, the second target window on the second display screen is still hidden. The second electronic device obtains the first coordinate information relative to the second target window based on the second coordinate information at this time and sends it to the first electronic device. The first electronic device displays the first target object after the movement on the first display screen based on the first coordinate information.

In some embodiments, when the second coordinate information coincides with the target edge, the second electronic device may first convert the second coordinate information from the first edge to the second edge, and at the same time, continue to control the second target object to be in a display state, and not provide the first coordinate information to the first electronic device.

After the second coordinate information is converted to the second edge, when the user of the second electronic device continues to operate the second coordinate information to move toward the first edge, the second electronic device may control the second target object to be in a hidden state, and provide the first coordinate information to the first electronic device such that the first electronic device can display the first target object.

In some embodiments, the control method may further include, if the second coordinate information coincides with the second edge of the second target window, converting the second coordinate information from the second edge to the first edge, and controlling the second target window to be in a transparent display state and the second target object to be in a display state.

The method of converting the second coordinate information from the second edge to the first edge is consistent with the method of converting the second edge from the first edge, which will not be repeated here.

In the case where the second coordinate information and the second edge coincide with each other, the second electronic device may not provide the first coordinate information to the first electronic device, and correspondingly, the first electronic device may no longer display the first target object.

Consistent with the present disclosure, on one hand, the second electronic device can create a second target window in the second display screen, and obtain the first coordinate information indicating the movement of the first target object through the second target window without creating a virtual screen representing the first display screen. Therefore, when the second electronic device uses the method of this embodiment to perform cross-screen control on the first electronic device, the overhead of system resources can be reduced. On the other hand, the second electronic device can control the first electronic device to display the first target object based on the first coordinate information and to display the second content generated by the first electronic device itself by providing the first coordinate information to the first electronic device. In addition, the second electronic device can adjust the first coordinate information based on the user's operation, and then operate the display content of the first display screen through the first target object displayed based on the first coordinate information. Therefore, this technical solution can meet the needs of controlling another device through one device connected by screen projection in some usage scenarios, and displaying the content generated by two devices on one device at the same time.

Figure 8:
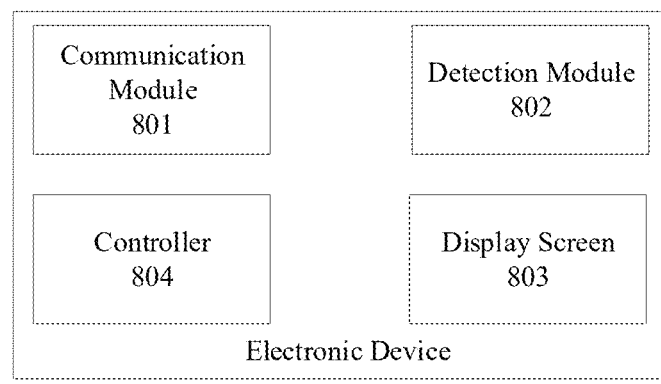
FIG. 8 is a schematic structural diagram of the electronic device according to some embodiments of the present disclosure.

FIG. 8 is a schematic structural diagram of the electronic device according to some embodiments of the present disclosure. The electronic device may be the first electronic device described in the foregoing embodiments. The electronic device includes a communication module 801, a detection module 802, a display screen 803, and a controller 804.

The communication module 801 may include at least one Bluetooth module, a wireless network card and a device interface.

The detection module 802 may include a module in the first electronic device that can detect the target parameter, for example, a gyroscope.

The controller 804 may be configured to establish a connection channel with the second electronic device through the communication module 801; if the detection module 802 determines that the first condition is met, send the display data representing the first content to the second electronic device through the connection channel to cause the second electronic device to display the first content, and obtaining operation information obtained by the second electronic device for the first content through the connection channel; and if the detection module 802 determines that the second condition is met, display the second content on the display screen 803 and obtain, through the connection channel, first coordinate information sent by the second electronic device and used to represent movement of the first target object, and display the first target object based on the first coordinate information, the first target object being used to operate the second content.

In some embodiments, meeting the first condition may include: the target parameter of the electronic device indicating that the electronic device is in the first attitude, and meeting the second condition may include: the target parameter of the electronic device indicating that the electronic device is in the second attitude. When the electronic device is in the second attitude, it is more convenient for the observer to observe the first display screen of the first electronic device than when the electronic device is in the first attitude.

In some embodiments, if the target parameter indicates that the electronic device is in the first attitude, the controller 804 may control the first electronic device to operate based on the first mode.

The first mode may include: creating a virtual screen based on the size of the second display screen of the second electronic device and the size of the first target window; obtaining the display data of the first content based on the virtual screen; sending the display data to the second electronic device through the connection channel for the second electronic device to display the first content in the first target window based on the display data; if second coordinate information representing the movement of a second target object is located in the first target window, obtaining first operation information through the connection channel, the second target object being used to operate the display content of the second display screen of the second electronic device, the operation information including operation events and operation coordinates; and adjusting the first content in response to the first operation information.

In some embodiments, if the target parameter indicates that the electronic device is in the second attitude, the controller 804 may control the first electronic device to operate based on the second mode.

The first mode may include: obtaining the first coordinate information for representing the movement of the first target object through the connection channel; displaying the first target object based on the first coordinate information; and obtaining the second operation information through the connection channel, and adjusting the second content in response to the second operation information.

In some embodiments, the electronic device may further include a signal scanning module and the controller 804 may be further configured to: scan the target signal through the signal scanning module, the target signal being radiated by the second electronic device; determine the location information based on the target signal, the location information indicating the relative position relationship between the electronic device and the second electronic device; and send the location information to the second electronic device through the connection channel for the second electronic device to display the first target window based on the location information, the first target window being located in an area where the second display screen can indicate the first electronic device.

In some embodiments, the electronic device may further include a signal scanning module and the controller 804 may be further configured to: scan the target signal through the signal scanning module, the target signal being radiated by the second electronic device; determine the location information based on the target signal, the location information indicating the relative position relationship between the electronic device and the second electronic device; and send the location information to the second electronic device through the connection channel for the second electronic device to determine the target edge based on the location information, the target edge being an edge where the second display screen indicates where the first electronic device is located.

In some embodiments, the signal scanning module may be a UWB module for scanning UWB signals.

In some embodiments, in the second mode, the controller 804 may be further configured to send the size of the first display screen to the second electronic device through the connection channel such that the second electronic device can create a second target window based on the size of the first display screen.

In some embodiments, the first coordinate information may be that, if the second coordinate information representing the movement of the second target object coincides with the target edge of the second display screen of the second electronic device, the mapping coordinate corresponding to the second target window obtained based on the actual coordinates of the second coordinate information.

Figure 9:
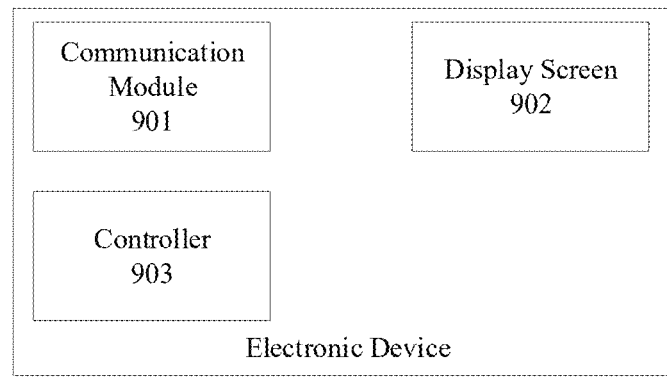
FIG. 9 is another schematic structural diagram of the electronic device according to some embodiments of the present disclosure.

FIG. 9 is another schematic structural diagram of the electronic device according to some embodiments of the present disclosure. The electronic device may be the second electronic device described in the foregoing embodiments. The electronic device includes a communication module 901, a display screen 902 and a controller 903.

The communication module 901 may include at least one Bluetooth module, a wireless network card and a device interface.

The controller 903 may be configured to obtain a target request through the connection channel between the communication module 901 and the first electronic device; based on the target request, create a second target window on the display screen 902 that is in a disabled state, the second target window being determined based on the size of the first display screen of the first electronic device; and if the second coordinate information indicates the movement of the second target object coincides with the target edge of the display screen 902, control the second target window to be in a transparent display state i.e., an invisible and enabled state (i.e., the second target window being invisible and enabled) and controlling the second target object to be in a hidden state, and convert the second coordinate information from the first edge of the second target window to the second edge of the second target window. In some embodiments, the first edge may coincide with the target edge, the second edge may be opposite to the first edge, and the second target window may be used to operate the display content of the second display screen of the second electronic device. The controller 903 may be further configured to obtain the first coordinate information based on the second coordinate information, the first coordinate information being a mapping coordinate corresponding to the second target window obtained based on the actual coordinate of the second coordinate information; and send the first coordinate information through the connection channel for the first electronic device to display the first target object based on the first coordinate information, the first target object being used to operate the display content of the first display screen.

In some embodiments, the controller 903 may be further configured to, if the second coordinate information coincides with the second edge of the second target window, convert the second coordinate information from the second edge to the first edge, and control the second target window to be in a transparent display state and the second target object to be in a display state.

In some embodiments, the second electronic device may further include a positioning module, which may be module capable of radiating a target signal, for example, a UWB tag capable of radiating a UWB signal.

The specific working principle of the electronic device provided in this embodiment can be found in the relevant steps of the control method described in the foregoing embodiments, and will not be described in detail here.

The embodiments in this specification are described in a progressive manner, each embodiment emphasizes a difference from the other embodiments, and the identical or similar parts between the embodiments may be made reference to each other.

For ease of description, when the above apparatus is described, functions are divided into various modules and described separately. The functions of each module can be implemented in one or more software and/or hardware when the present disclosure is implemented.

According to the description of the above embodiments, those skilled in the art can clearly understand that the present disclosure can be implemented in manners of software plus a necessary general hardware platform. Based on this understanding, the essence of the technical solutions of the present disclosure or a part that contributes to the existing technology can be embodied in forms of software products. The computer software products can be stored in a storage medium, such as a ROM/RAM, a disk, an optical disc, etc., including several instructions to cause a computer device (which may be a personal computer, a server, a network device, etc.) to execute the method or some parts of the method consistent with the present disclosure.

Relational terms such as first, second, third and fourth are only used herein to distinguish one entity or operation from another entity or operation, and do not necessarily require or imply any such actual relationship or order between these entities or operations. The terms "include," "involve" or any other variations thereof are intended to cover non-exclusive inclusion, so that a process, method, object, or device including a series of elements not only includes those elements, but also includes other elements that are not explicitly listed, or also includes elements inherent to such processes, method, object, or device. Without further restrictions, the element associated with phrase "including a . . . " does not exclude the existence of other identical elements in the process, method, object, or device that includes the element.

The above is a detailed description of the embodiments of the present disclosure, but does not limit the protected scope of the present disclosure. Any variation or substitution made by a person skilled in the art within the technical scope disclosed in the present disclosure should be covered by the protected scope of the present disclosure.

What is claimed is:

1. A control method, comprising:
   establishing a connection channel with a second electronic device;
   in response to a first condition being met, sending display data representing a first content to the second electronic device through the connection channel to cause the second electronic device to display the first content, and obtaining operation information on the first content obtained by the second electronic device through the connection channel, the first condition being met in response to a target parameter of a first electronic device indicating that the electronic device is in a first attitude; and
   in response to a second condition being met, displaying a second content and obtaining, through the connection channel, first coordinate information sent by the second electronic device and used to represent movement of a first target object, and displaying the first target object based on the first coordinate information, the first target object being used to operate the second content, the second condition being met in response to the target parameter of the first electronic device indicating that the first electronic device is in a second attitude, the first electronic device in the second attitude being more convenient for an observer to observe a first display screen of the first electronic device than when the first electronic device is in the first attitude.

2. The method of claim 1, further comprising:
   in response to the target parameter indicating that the first electronic device is in the first attitude, operating the first electronic device based on a first mode, including:
      creating a virtual screen based on a size of a second display screen of the second electronic device and a size of a first target window;
      obtaining the display data of the first content based on the virtual screen;
      sending the display data to the second electronic device through the connection channel to cause the second electronic device to display the first content in the first target window based on the display data;
      in response to second coordinate information that represents movement of a second target object being located within the first target window, obtaining first operation information through the connection channel, the second target object being used to operate the display screen of the second display screen of the second electronic device, the operation information including operation events and operation coordinates; and
      adjusting the first content in response to the first operation information; and
   in response to the target parameter indicating that the first electronic device is in the second attitude, operating the first electronic device based on a second mode, including:
      obtaining the first coordinate information for characterizing the movement of the first target object through the connection channel;
      displaying the first target object based on the first coordinate information; and
      obtaining second operation information through the connection channel, and adjusting the second content in response to the second operation information.

3. The method of claim 2, further comprising:
   scanning a target signal, the target signal being radiated by the second electronic device;
   determining locate information based on the target signal, the location information representing a relative position relationship between the first electronic device and the second electronic device; and
   sending the location information to the second electronic device through the connection channel to cause the second electronic device to display the first target window based on the location information, the first target window being located in an area of the second display screen for indicating the first electronic device.

4. The method of claim 2, further comprising:
   scanning a target signal, the target signal being radiated by the second electronic device;
   determining locate information based on the target signal, the location information representing a relative position relationship between the first electronic device and the second electronic device; and
   sending the location information to the second electronic device through the connection channel to cause the second electronic device to determine a target edge based on the location information, the target edge being an edge where the second display screen indicates where the first electronic device is located.

5. The method of claim 4, wherein operating the first electronic device based on the second mode further includes:
   sending the size of the first display screen to the second electronic device through the connection channel to cause the second electronic device to create a second target window based on the size of the first display screen,
   the first coordinate information being a mapping coordinates corresponding to the second target window obtained based on actual coordinates of the second coordinate information in response to the second coordinate information that represents the movement of the second target object coinciding with the target edge of the second display screen of the second electronic device.

6. A control method, comprising:
obtaining a target request through a connection channel with a first electronic device;
based on the target request, creating a second target window that is in a disabled state, the second target window being determined based on a size of a first display screen of the first electronic;
in response to second coordinate information that indicating movement of a second target object coinciding with a target edge, controlling the second target window to be in an invisible and enabled state and the second target object to be in a hidden state, and converting the second coordinate information from a first edge of the second target window to a second edge of the second target window, the first edge coinciding with the target edge, the second edge being opposite to the first edge, the second target object being used to operate display content of the second display screen of a second electronic device;
obtaining first coordinate information based on the second coordinate information, the first coordinate information being a mapping coordinates corresponding to the second target window obtained based on actual coordinates of the second coordinate information; and
sending the first coordinate information through the connection channel to cause the first electronic device to display a first target object based on the first coordinate information, the first target object being used to operate the display content of the first display screen.

7. The method of claim 6, further comprising:
in response to the second coordinate information coinciding with the second edge of the second target window, converting the second coordinate information from the second edge to the first edge, and controlling the second target window to be in the invisible and enabled state and the second target object to be in a display state.

8. An electronic device comprising:
a communication module;
a detection module;
a display screen; and
a controller, the controller being configured to:
  establish a connection channel with a second electronic device through the communication module;
  in response to the detection module determining that a first condition is met, send display data representing a first content to the second electronic device through the connection channel to cause the second electronic device to display the first content, and obtain operation information on the first content obtained by the second electronic device through the connection channel, the first condition being met in response to a target parameter of the electronic device indicating that the electronic device is in a first attitude; and
  in response to the detection module determining that a second condition is met, display a second content on the display screen and obtain, through the connection channel, first coordinate information sent by the second electronic device and used to represent movement of a first target object, and display the first target object based on the first coordinate information, the first target object being used to operate the second content, the second condition being met in response to the target parameter of the electronic device indicating that the electronic device is in a second attitude, the electronic device in the second attitude being more convenient for an observer to observe a first display screen of the electronic device than when the electronic device is in the first attitude.

9. The electronic device of claim 8, wherein:
in response to the target parameter indicating that the electronic device is in the first attitude, the controller is further configured to control the electronic device to operate based on a first mode, including:
  creating a virtual screen based on a size of a second display screen of the second electronic device and a size of a first target window;
  obtaining the display data of the first content based on the virtual screen;
  sending the display data to the second electronic device through the connection channel to cause the second electronic device to display the first content in the first target window based on the display data;
  in response to second coordinate information that represents movement of a second target object being located within the first target window, obtaining first operation information through the connection channel, the second target object being used to operate the display screen of the second display screen of the second electronic device, the operation information including operation events and operation coordinates; and
  adjusting the first content in response to the first operation information; and
in response to the target parameter indicating that the electronic device is in the second attitude, the controller is further configured to control the electronic device to operate based on a second mode, including:
  obtaining the first coordinate information for characterizing the movement of the first target object through the connection channel;
  displaying the first target object based on the first coordinate information; and
  obtaining second operation information through the connection channel, and adjusting the second content in response to the second operation information.

10. The electronic device of claim 9, further comprising:
a signal scanning module;
wherein the controller is further configured to:
  scan a target signal, the target signal being radiated by the second electronic device;
  determine locate information based on the target signal, the location information representing a relative position relationship between the electronic device and the second electronic device; and
  send the location information to the second electronic device through the connection channel to cause the second electronic device to display the first target window based on the location information, the first target window being located in an area of the second display screen for indicating the electronic device.

11. The electronic device of claim 9, further comprising:
a signal scanning module;
wherein the controller is further configured to:
  scan a target signal, the target signal being radiated by the second electronic device;
  determine locate information based on the target signal, the location information representing a relative position relationship between the electronic device and the second electronic device; and send the location information to the second electronic device through the connection channel to cause the second electronic device to determine a target edge based on the location information, the target edge being an edge where the second display screen indicates where the electronic device is located.

12. The electronic device of claim 11, wherein in the second mode, the controller is further configured to:

send the size of the first display screen to the second electronic device through the connection channel to cause the second electronic device to create a second target window based on the size of the first display screen, the first coordinate information being a mapping coordinates corresponding to the second target window obtained based on actual coordinates of the second coordinate information in response to the second coordinate information that represents the movement of the second target object coinciding with the target edge of the second display screen of the second electronic device.

* * * * *